UNITED STATES PATENT OFFICE.

CHARLES SUMNER TAINTER, OF WASHINGTON, DISTRICT OF COLUMBIA.

TABLET FOR USE IN GRAPHOPHONES.

SPECIFICATION forming part of Letters Patent No. 393,190, dated November 20, 1888.

Application filed November 19, 1887. Serial No. 255,662. (Model.)

*To all whom it may concern:*

Be it known that I, CHARLES SUMNER TAINTER, of Washington, in the District of Columbia, have invented a new and useful Improvement in Tablets for Use in Graphophones, which improvement is fully set forth in the following specification.

This invention has reference to the preparation of a recording surface or medium for graphophones, or apparatus for recording and reproducing speech and other sounds, wherein the sound-record is cut or graven by a cutting-style. In such apparatus the recording medium or composition (usually wax or a wax-like substance) is spread in a thin layer on a suitable base or foundation—such as paper or pasteboard—constituting what is termed the "tablet." Very few substances are found suitable for this purpose, as properties or characteristics of a peculiar kind are essential to the production of an accurate record—one that will not be impaired by lapse of time and which will give loud and clear reproduction.

In an application filed by me November 14, 1887, and numbered 255,082, I have set forth the principal difficulties encountered in the preparation of a recording-tablet and the reason why most of the waxes commonly known and mixtures of them are unfit for the purpose. It will not, therefore, be necessary to repeat such statement here, it being sufficient to say that the present invention consists in certain waxy compositions which have been found to possess the necessary characteristics to render them suitable as the recording medium of graphophonic tablets.

A number of common waxes—such as beeswax, for example—have certain properties that are advantageous and useful, but lack hardness and resistance to changes of temperature and other conditions requisite to successful employment. Beeswax, for example, cuts smoothly, but is too soft and sticky. It has been found that waxes of this nature can be rendered suitable for the use desired by an admixture of a proper proportion of a substance known as "carnauba-wax." This wax itself is very hard and brittle, and, in cutting, chips off in small particles; but it mixes readily with beeswax and waxes of like nature and forms a compound eminently suitable for the recording-surface of a graphophonic tablet. Among other substances with which the carnauba-wax may be mixed, and which for this purpose may be regarded as the equivalent of beeswax, are cerasine-wax, paraffine, and bay-wax—sometimes called "bayberry" or "myrtle" wax.

In preparing the mixture, I take from fifteen to forty per cent. of carnauba-wax to from sixty to eighty-five per cent. of the softer wax—such as white beeswax. The maximum proportion of carnauba-wax is used in warm weather, and at high summer heat will render the mixture sufficiently hard. At more moderate temperatures a smaller amount of carnauba-wax is preferably employed.

The waxes, in the proportions indicated, are melted and thoroughly mixed together, and are applied to the base or foundation of the tablet in any suitable way.

I claim—

1. As the recording medium for graphophonic records, a waxy composition containing carnauba-wax in admixture with other softer wax, substantially as described.

2. As the recording medium for graphophonic records, a mixture of carnauba-wax and beeswax, substantially as described.

In testimony whereof I have signed this specification in the presence of two subscribing witnesses.

CHARLES SUMNER TAINTER.

Witnesses:
HARRY M. PAYNE,
PHILIP MAURO.